(12) United States Patent
Yokoyama

(10) Patent No.: US 12,416,502 B2
(45) Date of Patent: Sep. 16, 2025

(54) DISASTER INFORMATION NOTIFICATION SYSTEM

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 70 days.

(21) Appl. No.: 18/138,418

(22) Filed: Apr. 24, 2023

(65) Prior Publication Data

US 2023/0417560 A1  Dec. 28, 2023

(30) Foreign Application Priority Data

Jun. 28, 2022 (JP) .................................. 2022-103200

(51) Int. Cl.
  *G01C 21/00* (2006.01)
  *G01C 21/34* (2006.01)
  *G01C 21/36* (2006.01)

(52) U.S. Cl.
  CPC ..... *G01C 21/3415* (2013.01); *G01C 21/3461* (2013.01); *G01C 21/3492* (2013.01); *G01C 21/3694* (2013.01); *G01C 21/3697* (2013.01)

(58) Field of Classification Search
  CPC ............ G01C 21/3415; G01C 21/3461; G01C 2/3492; G01C 21/3694; G01C 21/3697
  See application file for complete search history.

(56) References Cited

U.S. PATENT DOCUMENTS

| | | | | |
|---|---|---|---|---|
| 2012/0231727 A1* | 9/2012 | Nagata | ................... | G06Q 50/26 455/3.06 |
| 2016/0147073 A1* | 5/2016 | Onda | ....................... | B60R 1/24 345/7 |
| 2019/0179305 A1* | 6/2019 | Magzimof | ............ | B60W 30/00 |
| 2020/0408542 A1* | 12/2020 | Oe | .......................... | G06V 20/56 |
| 2021/0024089 A1* | 1/2021 | Ito | ........................ | G05D 1/0011 |

FOREIGN PATENT DOCUMENTS

| | | |
|---|---|---|
| JP | 2011-209163 A | 10/2011 |
| JP | 2020-088741 A | 6/2020 |

* cited by examiner

*Primary Examiner* — Adnan M Mirza
(74) *Attorney, Agent, or Firm* — Sughrue Mion, PLLC

(57) ABSTRACT

The disaster information notification system includes a disaster information acquisition unit that acquires disaster information related to a disaster, a vehicle operation information acquisition unit that acquires vehicle operation information related to the operation of the vehicle, a guidance information generation unit that generates guidance information related to guidance of the vehicle based on the disaster information and the vehicle operation information, and a display control unit that controls display of the guidance information on a display unit mounted on the vehicle in a format capable of visually recognizing a degree of the disaster, a position where the disaster has occurred, and a traveling direction of the vehicle.

4 Claims, 13 Drawing Sheets

DISASTER INFORMATION NOTIFICATION SYSTEM

CROSS-REFERENCE TO RELATED APPLICATION

This application claims priority to Japanese Patent application No. 2022-103200 filed on Jun. 28, 2022, incorporated herein by reference in its entirety.

BACKGROUND

1. Technical Field

The present disclosure relates to a disaster information notification system.

2. Description of Related Art

Disaster information notification systems that notify portable terminals of disaster information related to disasters such as earthquakes, fires, and tsunamis have been known and have already been put into practical use. In addition, a disaster information notification system that notifies a vehicle such as an automobile of disaster information is being developed. For example, Japanese Unexamined Patent application Publication No. 2020-88741 (JP 2020-88741 A) proposes a navigation system that displays a current position and a traveling direction of a vehicle, and that is configured to display the contents and the occurrence location of the disaster.

However, the known disaster information notification system for vehicles including JP 2020-88741 A only sends a notification of the contents of the disaster and the occurrence location, and does not provide sufficient information for the driver of the vehicle to determine whether the vehicle is allowed to travel along the guidance route indicated by the navigation system. For this reason, it is desired to provide a disaster information notification system that provides more accurate information on an operation of a vehicle in the event of a disaster and ensures the safety of movement after a disaster.

SUMMARY

An object of the present disclosure is to provide a disaster information notification system capable of providing accurate information on an operation of a vehicle when a disaster occurs and ensuring safety of movement of the vehicle after the disaster.

A disaster information notification system according to a first aspect of the present disclosure includes:
  a disaster information acquisition unit that acquires disaster information related to a disaster;
  a vehicle operation information acquisition unit that acquires vehicle operation information on an operation of a vehicle;
  a guidance information generation unit that generates guidance information concerning guidance of the vehicle, based on the disaster information and the vehicle operation information; and
  a display control unit that controls display of the guidance information on a display unit mounted on the vehicle, in a format in which a degree of the disaster, a location at which the disaster occurred, and a traveling direction of the vehicle are able to be visually recognized.

In the disaster information notification system according to the first aspect:
  the vehicle operation information acquisition unit is configured to acquire information on whether the vehicle is traveling on a specified road including an expressway, an automobile dedicated road, an elevated bridge, a predetermined coastal road, or a road of a predetermined mountain area; and
  the guidance information generation unit is configured such that when a determination is made that the vehicle is traveling on the specified road, the guidance information generation unit generates guidance information to guide the vehicle to leave the specified road, based on the disaster information.

In the disaster information notification system according to the first aspect:
  the guidance information generation unit is configured to determine whether a traffic congestion is occurring at a travel destination where the vehicle is scheduled to travel on the specified road, or whether an emergency avoidance operation of a preceding vehicle has been executed at the travel destination; and
  the guidance information generation unit is configured to generate first guidance information when the determination is negative, and generates second guidance information that has higher urgency than the first guidance information when the determination is positive.

In the disaster information notification system according to the first aspect, the guidance information generation unit is configured to determine whether a predetermined disaster is occurring in an area in which the vehicle is traveling, and generates emergency stopping information for the vehicle when the determination is affirmative.

In the disaster information notification system according to the first aspect, the emergency stopping information includes an indication prompting attention to another vehicle traveling around the vehicle.

According to the disaster information notification system according to the present disclosure, it is possible to provide a disaster information notification system capable of providing accurate information on an operation of a vehicle when a disaster occurs and ensuring safety of movement of the vehicle after the disaster.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is an example of an emergency stop screen that is displayed in the disaster information notification system 1 according to the third embodiment and that requires blinking of a hazard lamp and an emergency stop to a road shoulder or the like.

DETAILED DESCRIPTION OF EMBODIMENTS

Figure 1:
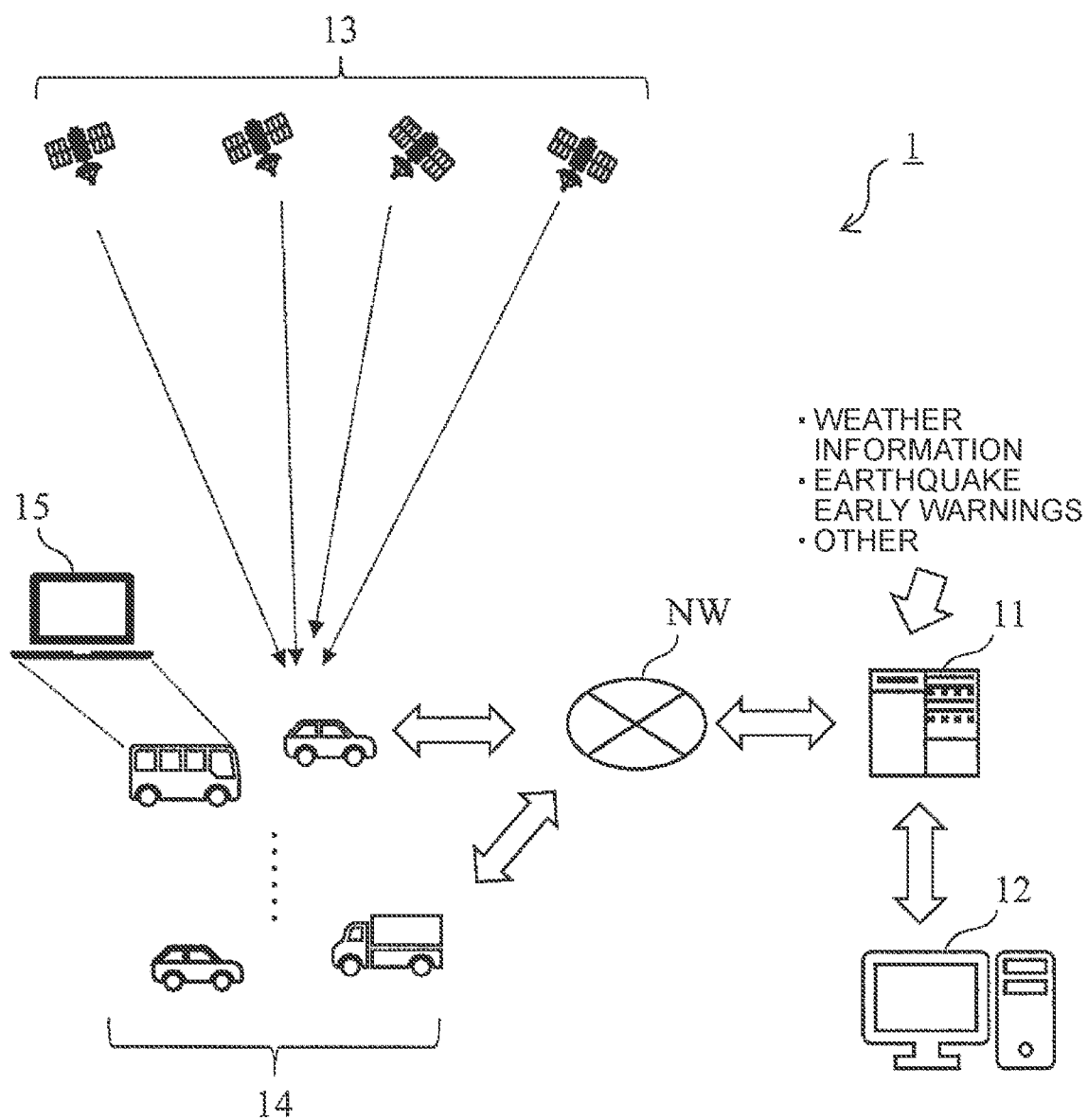
FIG. 1 is a schematic diagram illustrating an overall configuration of a disaster information notification system 1 according to a first embodiment.

Hereinafter, the present embodiment will be described with reference to the accompanying drawings. In the accompanying drawings, functionally identical elements may be denoted by the same reference numerals. It should be noted that although the accompanying drawings illustrate embodiments and implementations consistent with the principles of the present disclosure, these are for understanding of the present disclosure and are not to be used to limit the present disclosure in any way. The description herein is merely exemplary in nature and is in no way intended to limit the scope or applicability of the claims of the present disclosure.

Although the present embodiment has been described in sufficient detail to enable those skilled in the art to practice the present disclosure, it should be understood that other implementations and forms are possible, and that changes to configurations and structures and substitutions of various elements can be made without departing from the scope and spirit of the technical idea of the present disclosure. Therefore, the following description should not be construed as being limited thereto.

First Embodiment

A disaster information notification system 1 according to a first embodiment will be described with reference to FIG. 1. The disaster information notification system 1 may include, for example, a data collection server 11 and a control computer 12. GNSS satellites 13 (artificial satellites) can receive radio waves, and a large number of vehicles 14 (passenger cars, freight cars, passenger cars, special cars, motorcycles, etc.) including a navigation system (e.g., tens of thousands to 10 million vehicles) are connected to the disaster information notification system 1 via a network NW. The vehicle 14 transmits data including vehicle operation information and the like to the disaster information notification system 1, and receives data related to a disaster.

The vehicle 14 is equipped with a known navigation system 15. Note that, in FIG. 1, the data collection server 11 and the control computer 12 are illustrated one by one, but this is an example, and it is needless to say that a plurality of data collection servers may be prepared.

As is well known, the navigation system 15 mounted on each of the many vehicles 14 receives radio waves from GNSS satellites 13 by GNSS antennae (not shown) mounted on the vehicle 14, and acquires latitude and longitude information as position information calculated from the radio waves. The navigation system 15 corrects the latitude and longitude information by comparing the latitude and longitude information with the map data, generates corrected position information, and displays the position of the own vehicle on the map according to the corrected position information. In addition, the navigation system 15 generates guidance route information as an optimum route from the current position to the destination according to the designated destination, and displays the guidance route information on the map.

Vehicle operation information regarding position information, guidance route information, traveling direction, and the like acquired by the navigation system 15 mounted on the vehicle 14 is transmitted to the data collection server 11 via the network NW. In addition to the vehicle operation information, the data collection server 11 receives weather information (particularly related to a disaster), emergency earthquake warning, eruption information, road information (particularly related to a disaster such as a road collapse), and disaster information related to a disaster from an external data server via a network NW. The control computer 12 generates guidance information for guiding the vehicle 14 in the event of a disaster in accordance with the data collected by the data collection server 11, and displays the guidance information on the display of the navigation system 15. The guidance information is displayed on the display of the navigation system 15 in preference to the guidance route information generated according to the destination.

Figure 2:
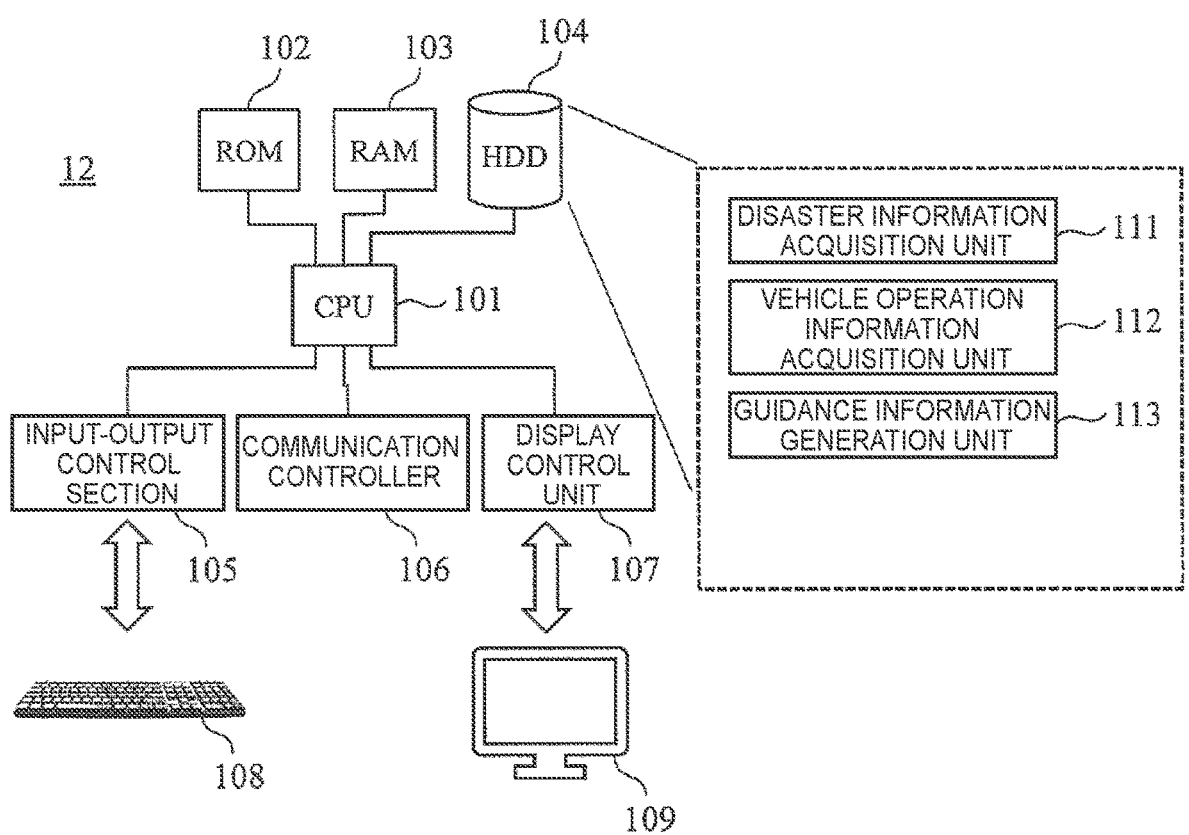
FIG. 2 is a hardware configuration diagram and a functional block diagram of the control computer 12.

FIG. 2 is a hardware configuration diagram and a functional block diagram of the control computer 12. The control computer 12 may be constituted by a general-purpose computer, and may include, for example, a CPU 101, Read Only Memory(ROM)102, Random Access Memory(RAM)103, a hard disk drive (HDD)104, an input/output control unit 105, a communication control unit 106, a display control unit 107, an input device 108, and a display 109.

CPU 101 is a central control unit for performing various calculations and determinations required for the operation of the present system together with a computer program to be described later. ROM 102, RAM 103 and the hard disk drive 104 are storage devices for storing various types of data and the like at the time of calculation and determination in the present system. The input device 108 is a device for an operator to input various data and commands via the input/output control unit 105, and is, for example, a keyboard, a mouse, a pointing device, or the like. The communication control unit 106 is a control unit that controls communication with the data collection server 11 and other external computers. The display 109 is a display device for displaying a result of earthquake prediction or the like. Note that the control computer 12 may be an automatic control that operates without an operator, and in this case, the input device 108, the display 109, and the like may be omitted.

A computer program for notification of disaster information for realizing the present system is installed in the hard disk drive 104 or another storage device. The computer program for notification of disaster information is activated to virtually realize the disaster information acquisition unit 111, the vehicle operation information acquisition unit 112, and the guidance information generation unit 113 in the control computer 12. The computer program may be stored in a portable storage medium such as a CD-ROM or memory card.

The disaster information acquisition unit 111 acquires, from an external computer or the like, weather information (particularly related to a disaster), emergency earthquake warning, road information (particularly related to a disaster such as a road collapse), and other disaster information related to a disaster via the network NW and the communication control unit 106. The vehicle operation information acquisition unit 112 acquires, from the vehicle 14, vehicle operation information related to the operation status of the vehicle 14 (route information, travel history, present position, velocity, steering, braking, etc.) via the network NW and the communication control unit 106. The guidance information generation unit 113 generates guidance information related to guidance of the vehicle 14 in accordance with the disaster information and the vehicle operation information.

Figure 3:
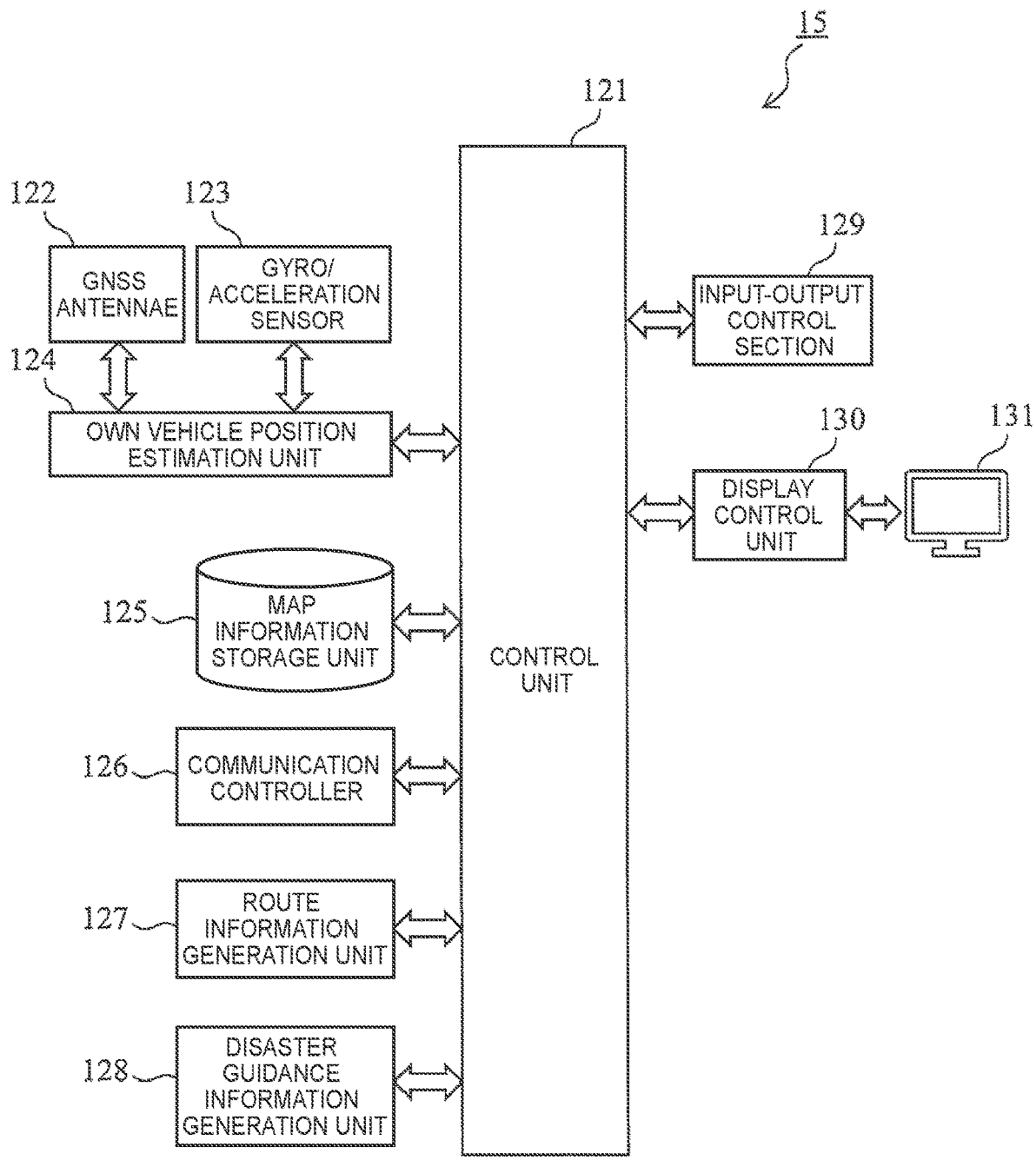
FIG. 3 is a block diagram illustrating an example of a configuration of the navigation system 15.

An example of the configuration of the navigation system 15 will be described with reference to FIG. 3. The navigation system 15 may include, for example, a control unit 121, a GNSS antenna 122, a gyro/acceleration sensor 123, a vehicle position estimation unit 124, a map information storage unit 125, a communication control unit 126, a route information generation unit 127, a disaster guidance information generation unit 128, an input/output control unit 129, a display control unit 130, and a display 131.

The control unit 121 controls the overall operation of the navigation system 15. GNSS antennae 122 receive radio waves from GNSS satellites 13. The gyro/acceleration sensor 123 is a sensor that measures acceleration and angular velocity of the vehicle 14. The own-vehicle position estimation unit 124 estimates the present position of the vehicle 14 according to the signal corresponding to the received radio wave of GNSS antennae 122 and the detected signal of the gyro/acceleration sensor 123.

The map information storage unit 125 is a storage device that stores a map of a region in which the vehicle 14 travels, information on various facilities existing in the region, and information on regulations of the road. The information stored in the map information storage unit 125 can be appropriately updated by a data server (not shown) via a network NW. The route information generation unit 127 generates information on a guidance route when the vehicle 14 travels toward the destination based on the input position, current position, and the like of the destination. The disaster guidance information generation unit 128 processes the guidance information generated by the guidance information generation unit 113 to generate disaster guidance information corresponding to the current position of the vehicle 14 or the like.

The input/output control unit 129 controls an input operation from an input device for inputting various kinds of information necessary for navigation from a driver or the like of the vehicle 14. The display control unit 130 controls various displays including the display of the disaster guidance information on the display 131.

Figure 4:
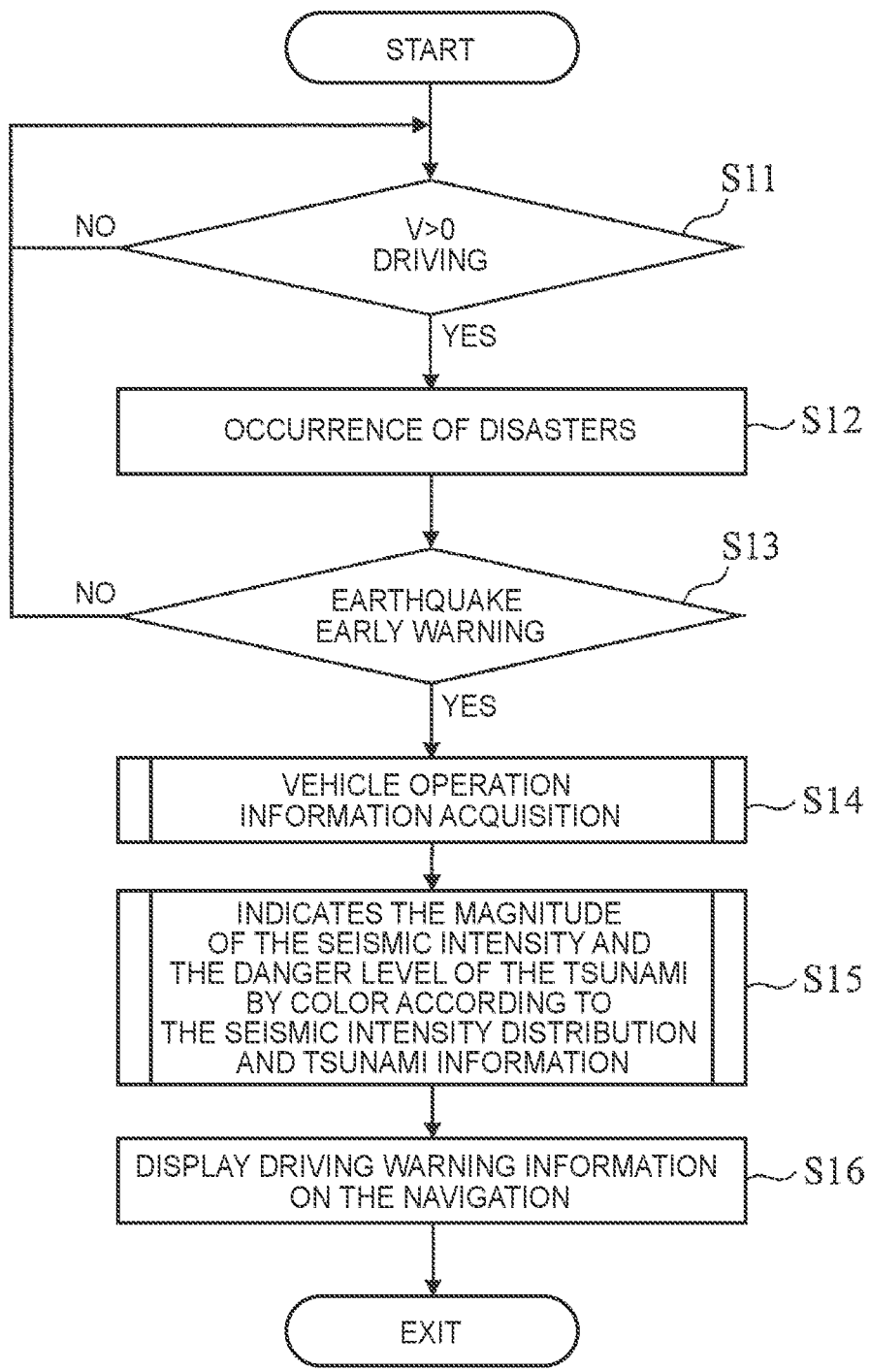
FIG. 4 is a flowchart illustrating an operation of the disaster information notification system 1 according to the first embodiment.

Next, the operation of the disaster information notification system 1 of the first embodiment will be described with reference to the flowchart of FIG. 4. Here, the case where an earthquake occurs as an example of a disaster and an emergency earthquake warning is received as the disaster information will be described as an example, but in the case of other disasters, the basic procedure of the processing is the same.

When the vehicle 14 is traveling at a predetermined velocity V (>0) (Y in S11 of step), a disaster (earthquake) occurs in an area associated with the area where the vehicle 14 is traveling (step S12), and when the data collection server 11 obtains a corresponding emergency earthquake warning (Y in step S13), the data collection server 11 acquires vehicle operation information from the vehicle 14 traveling in an area associated with the earthquake (e.g., in a radial 100 km about the largest seismic intensity point) (step S14).

The guidance information generation unit 113 of the control computer 12 displays the magnitude of the seismic intensity and the danger level of the tsunami in a color-coded manner on a map in accordance with the seismic intensity distribution and the tsunami information indicated by the emergency earthquake warning (step S15). Then, it is determined whether or not the area determined as the dangerous area by the color-coded display matches the current position information, the traveling direction, or the guidance route information indicated by the vehicle 14, and when the area matches, the traveling warning information is displayed on the display of the navigation system 15 together with the map displayed in the color-coded display, and the driver is urged to pay attention (step S16).

Figure 5:
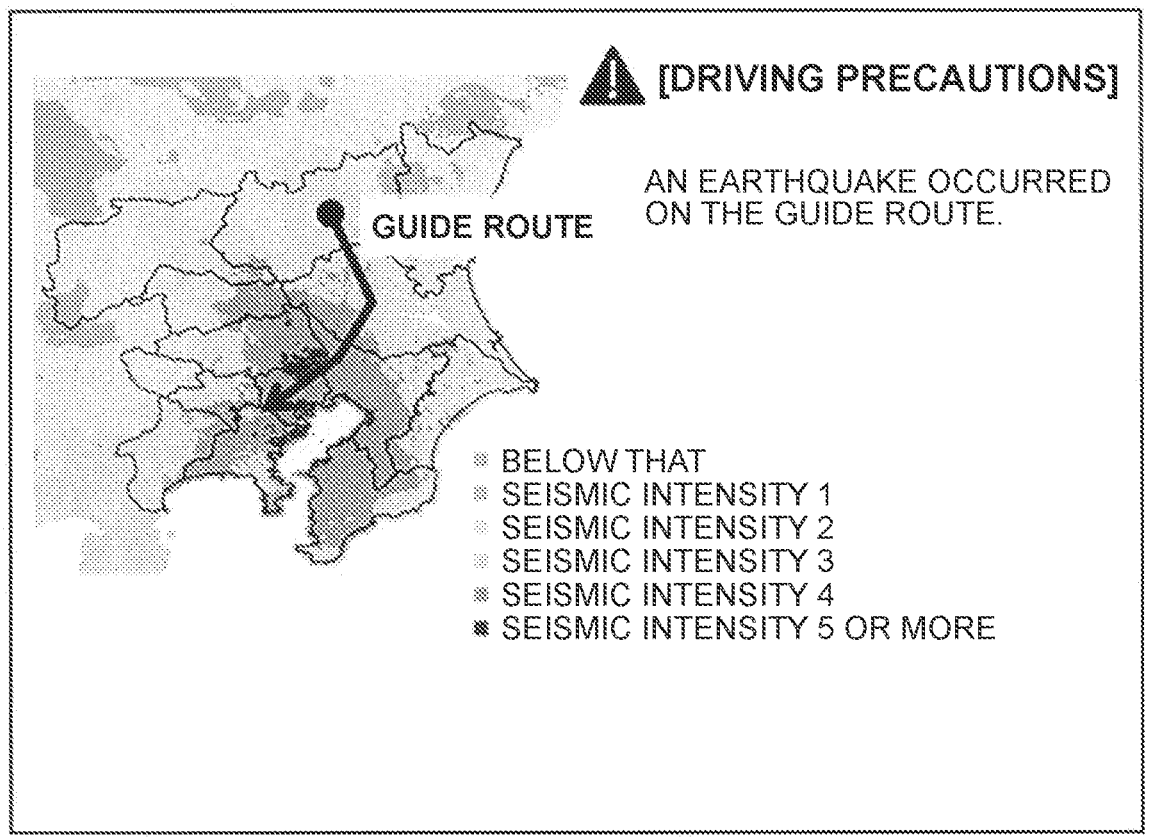
FIG. 5 shows an example of the display of the driving attention information on the display of the navigation system 15.

FIG. 5 shows an example of the display of the driving attention information on the display of the navigation system 15. The illustrated example only provides a color-coded display of the seismic intensity of the earthquake, but if there is tsunami information and the guidance route is an area affected by the tsunami (e.g., a road along a coastline), the risk of the tsunami can be color-coded and displayed as well.

In the example of FIG. 5, the seismic intensity distribution of the earthquake is displayed in a color-coded manner, and the map information indicating the degree and the position of the earthquake and the guidance route information (the traveling direction of the vehicle 14) by the navigation system 15 are displayed in a format that can be visually recognized in a duplicate manner. The color-coded display of the seismic intensity allows the driver of the vehicle 14 to visually and clearly understand that his vehicle 14 is heading to the seismic area and its risk. Based on the understanding, the driver can accurately determine whether or not to stop going to the destination. Therefore, according to the disaster information notification system 1 of the present embodiment, it is possible to provide accurate information regarding the operation of the vehicle when a disaster occurs, and to secure the safety of the movement of the vehicle after the disaster.

Second Embodiment

Figure 6A:
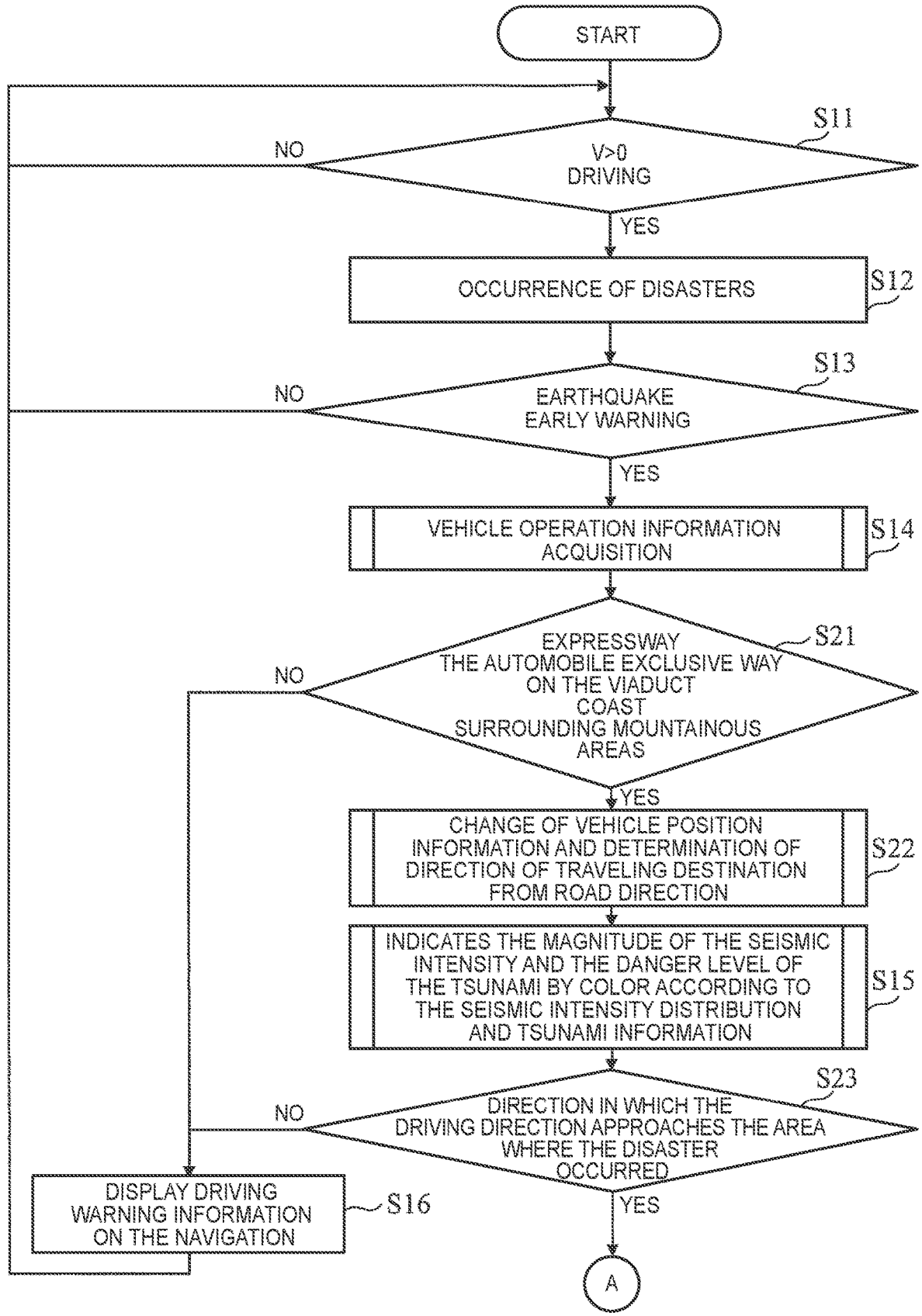
FIG. 6A is a diagram illustrating a configuration of a disaster information notification system according to a first embodiment.
Figure 6B:
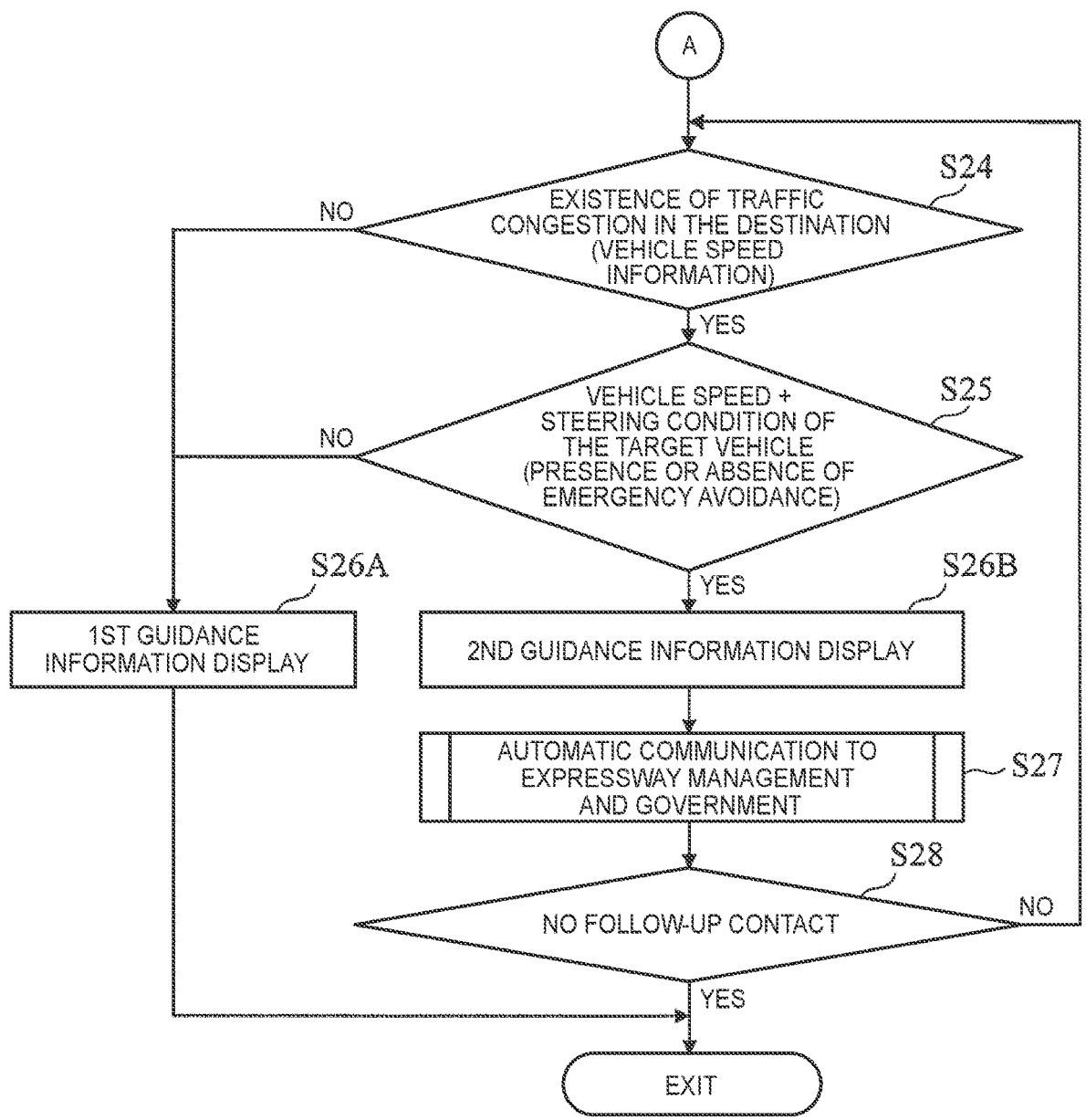
FIG. 6B is illustrating a configuration of a disaster information notification system according to a second embodiment.

FIGS. 6A, 6B illustrate a configuration of a disaster information notification system according to a second embodiment. Since the hardware configuration of the disaster information notification system 1 according to the second embodiment is the same as that of the first embodiment (FIGS. 1 to 3), redundant description will be omitted below. This second embodiment is different from the first embodiment in the point of generation and display of travel attention information when disaster information is obtained.

Referring to FIG. 6A and the flow chart of the FIG. 6B, the operation of the disaster information notification system 1 of the second embodiment will be described. Here, as in the first embodiment, a case where an emergency earthquake warning is received as the disaster information will be described as an example.

The operations from the step S11 to the step S14 are the same as those of the first embodiment. In the stepwise S14, the vehicle operation information is acquired by the vehicle operation information acquisition unit 112. The vehicle operation information includes information on whether or not the vehicle 14 is traveling on a specific road including an expressway, an automobile dedicated road, an elevated bridge, a predetermined coastal road, or a road in a predetermined mountainous region. The guidance information generation unit 113 determines whether or not the target vehicle 14 is traveling on the specified road in accordance with the vehicle operation information (step S21). The specific road may be preferably defined in the map information storage unit 125 or the like, but the information on the specific road may be received from the vehicle 14 as appropriate, or may be received from another server or the like.

In the step S21, when it is determined that the target vehicle 14 is not traveling on the specified road (N), the color-coded display of the seismic intensity or the like is not performed, and the traveling caution information indicating only that an earthquake has occurred is displayed on the display of the navigation system 15. When the driver is traveling on a normal general road, the driver can take a more flexible response according to the situation of the disaster than when the driver is traveling on a specific road. Therefore, in a case where the vehicle is not traveling on a specific road, the traveling caution information in which the seismic intensity distribution and the like are displayed by color is not presented, and the traveling caution information indicating only that an earthquake has occurred is displayed. In this way, the driving attention information corresponding to the situation is displayed, and thus the driver can easily take a more accurate response.

When it is determined in the step S21 that the target vehicle 14 is traveling on the specific road (Y), the direction of the traveling destination to which the vehicle 14 is scheduled to travel is determined according to the change of the vehicle position information included in the vehicle operation information and the direction of the specific road (step S22). Then, the guidance information generation unit 113 of the control computer 12 displays the magnitude of the seismic intensity and the risk of the tsunami by color coding on the map in accordance with the seismic intensity distribution and the tsunami information indicated by the emergency earthquake warning (step S15).

Next, the guidance information generation unit 113 determines whether or not the traveling direction of the vehicle 14 is a direction approaching a disaster (earthquake) occurrence area according to the received vehicle operation information (step S23). When it is determined that the vehicle is in the approaching direction (Y), the presence or absence of traffic congestion on the specified road of the traveling destination of the vehicle 14 is determined according to, for example, vehicle speed data measured by the gyro/acceleration sensor 123 or another in-vehicle sensor (step S24). When it is determined that there is a traffic jam (Y), it is determined whether or not an emergency-avoidance operation is performed in the preceding vehicle according to the vehicle speed and the steering-steering-information of the other vehicle (preceding vehicle) of the traveling destination (step S25). The emergency avoidance operation is an operation of a vehicle that is executed urgently to avoid an accident due to a road damage caused by an earthquake, a falling of a load, a fall, a collision, a failure, or the like of another vehicle, and includes, for example, an operation of a sudden steering wheel, a sudden braking, a Antilock Brake System (ABS, or the like.

When the determination in the step S24 or the step S25 is negative (N), the process proceeds to the step S26A, and the first guidance data is displayed. On the other hand, if both the determination of the step S24 and the determination of S25 are affirmative, the process proceeds to the step S26B, and the second guidance data is displayed. The second guidance information is information presented when the urgency is higher than that of the first guidance information.

The first guidance information is information that is presented when it is determined that the vehicle should leave the specific road in view of the occurrence of a disaster, although the first guidance information is not serious because there is no traffic congestion or emergency avoidance at the present time with respect to the situation of the traveling destination of the specific road on which the vehicle is traveling. For example, when an earthquake occurs and it is determined that the traveling destination is a direction approaching the earthquake source, the first guidance information indicates that it is recommended to descend in the next interchange, stop in the next service area or parking area, or stop urgently on a road shoulder or the like. For example, the background of the first guidance information is set to yellow to indicate that the guidance information is emergency. If a tsunami occurs and there is a concern about the arrival of a tsunami on a coastal road while driving, information is presented that recommends that the road be diverted away from the coastal road to the inland road. In addition, in the case of volcanic eruptions, information is presented that recommends stopping running in the direction of the volcanic eruption when it is expected that smoke or the like will arrive at the destination due to the wind direction or the like.

The second guidance information is presented in a case where a high degree of urgency is recognized, in which it is determined that the vehicle should be immediately separated from the specific road, since the traffic congestion has already occurred at the traveling destination of the specific road on which the vehicle is traveling and the preceding vehicle that is performing the emergency avoidance operation has also been identified. The second guidance information may indicate that an emergency stop is strongly recommended at the next interchange, at the next service area or parking area, or at a road shoulder or the like. In addition, making the background red may indicate that the guidance information is more urgent.

When the second guidance information is presented, information corresponding to the second guidance information is automatically communicated to companies and organizations (such as expressway management companies) and administrative agencies (prefectural offices, city offices, and the like) that manage the specified road (expressway) (step S27). Thereafter, it is determined whether or not there is no follow-up notification regarding the specific road of the traveling destination, and if there is no notification, the process ends. If a follow-up call is received, the process returns to S24 of steps, and the above operation is repeated.

In the flow chart of FIG. 6B, the second guidance information is displayed when both of the determination of the step S24 and the step S25 are positive (Y), but instead of this, the second guidance information may be displayed even when only one of the step S24 and the step S25 is positive.

Figure 7:
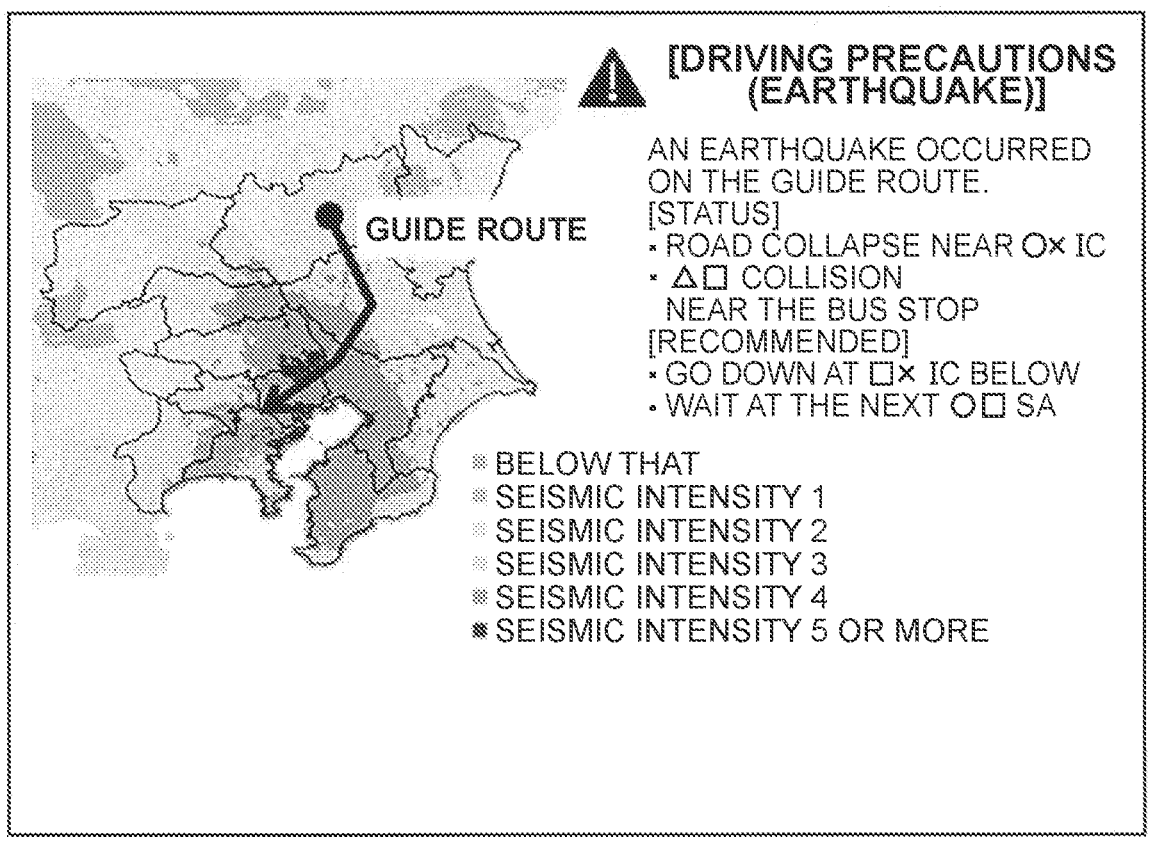
FIG. 7 is an example of the first or second guidance information displayed in the disaster information notification system 1 according to the second embodiment.

FIG. 7 shows an example of a screen displayed on the display of the navigation system 15 as the first or second emergency information when an earthquake occurs. In this screen, the situation of the guidance route and the recommended handling method are displayed together with the map and the guidance route displayed in color. In the case of the second emergency information with high urgency, the background is red and a high degree of urgency is indicated. In the case of the first emergency information with a relatively low urgency, the background is set to yellow. When the second emergency information is displayed, the screen may be blinked, an alarm may be called, or the like may be simultaneously performed in order to clearly indicate the degree of urgency.

Figure 8:
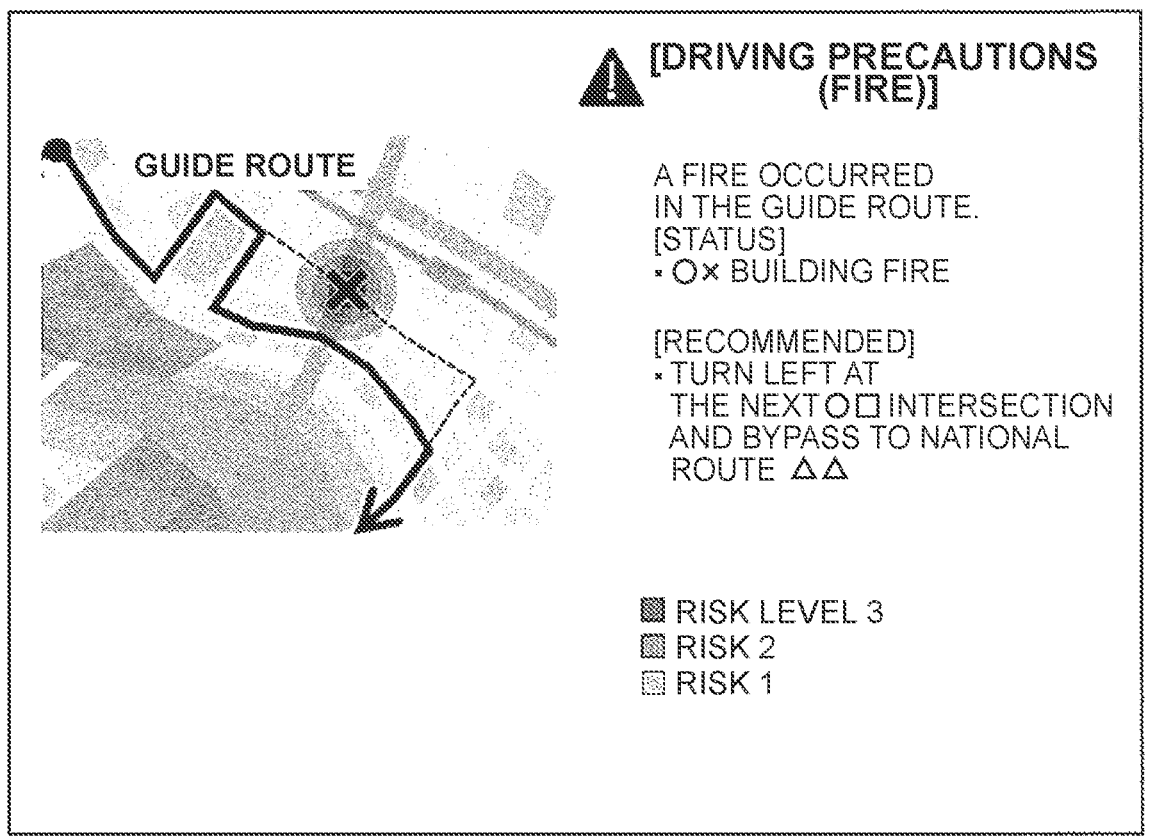
FIG. 8 is an example of the first or second guidance information displayed in the disaster information notification system 1 according to the second embodiment.

FIG. 8 shows an example of a screen displayed on the display of the navigation system 15 as the first or second emergency information when a fire occurs in a guidance route to be traveled. On this screen, a message indicating that a fire has occurred in the guidance route, a situation of the fire, and a recommended countermeasure method (whether the vehicle travels along the guidance route or travels through the bypass circuit after changing, etc.) are displayed together with the map of the color-coded display.

Figure 9:
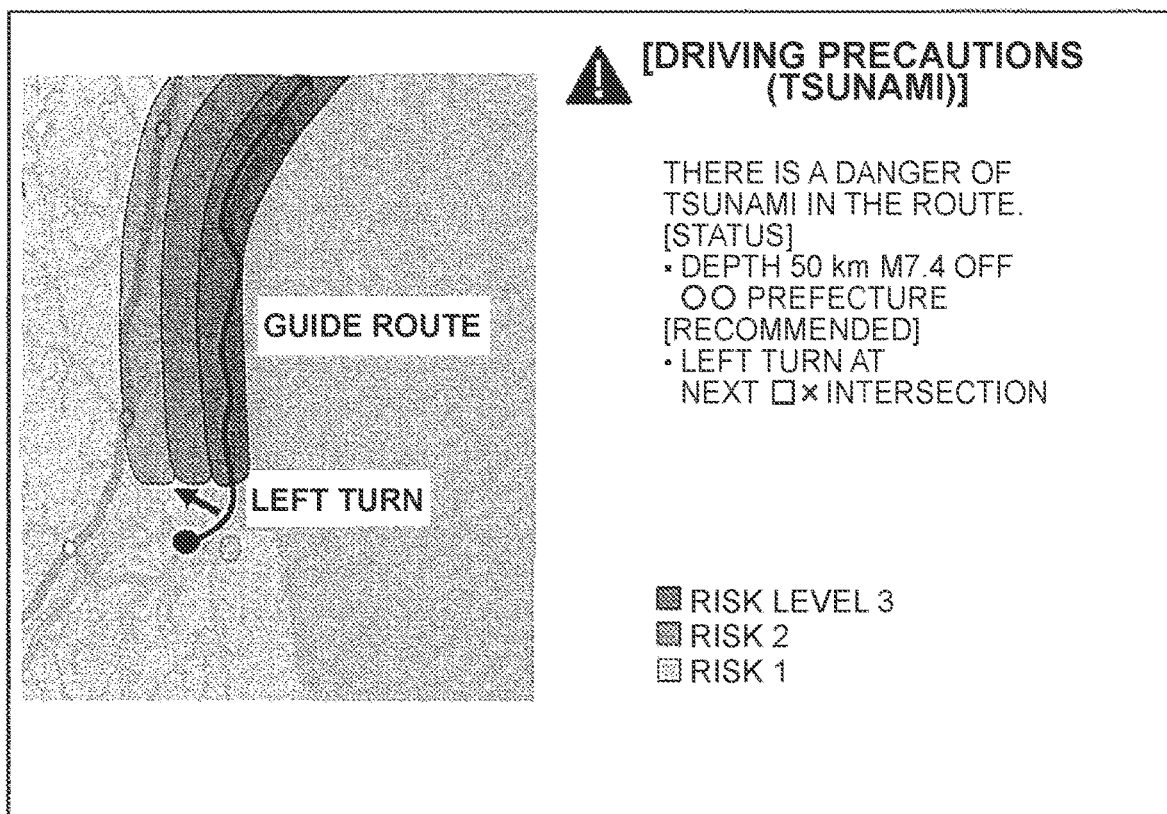
FIG. 9 is an example of the first or second guidance information displayed in the disaster information notification system 1 according to the second embodiment.

FIG. 9 shows an example of a screen displayed on the display of the navigation system 15 as the first or second emergency information in a case where the arrival of a tsunami is concerned on a coastal road which is a guidance route to be traveled. On this screen, the fact that there is a danger of tsunami in the guidance route, the situation of tsunami and earthquake, and the recommended countermeasures (whether to travel along the guidance route, to travel through the bypass circuit by changing, or to evacuate to the elevation by walking from the vehicle, etc.) are displayed together with the map of the color code display.

According to the disaster information notification system 1 of the second embodiment, the same effects as those of the first embodiment can be obtained. In addition, according to the disaster information notification system 1 of the second embodiment, it is determined whether or not the vehicle 14 is traveling on a specific road including an expressway or the like, and different disaster information (first/second guidance information, traveling attention information) is presented in accordance with the determination result, so that the driver of the vehicle 14 can acquire more accurate information in accordance with the situation.

When it is determined that the vehicle is traveling on a specific road, information on the traveling destination is acquired by an in-vehicle sensor of another vehicle traveling on the traveling destination. That is, in the second embodiment, another vehicle can function as a measurement device (probe) for detecting a disaster.

Third embodiment

Referring to 10A and 10B of FIG. 3, a disaster information notification system 1 according to a third embodiment will be described. Since the hardware configuration of the disaster information notification system 1 according to the third embodiment is the same as that of the first embodiment (FIGS. 1 to 3), redundant description will be omitted below. This third embodiment is different from the first embodiment in the point of generation and display of travel attention information when disaster information is obtained.

Figure 10A:
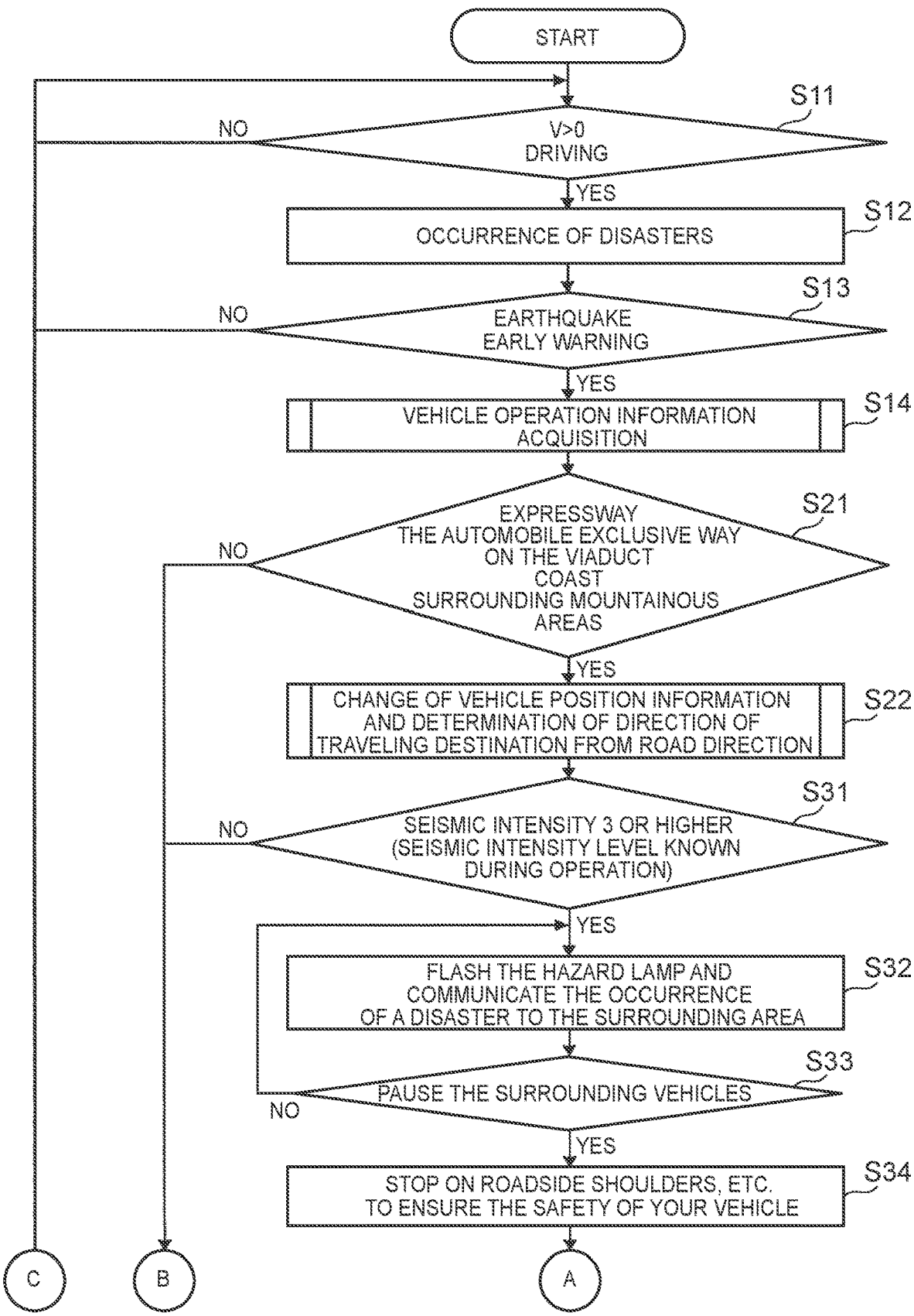
FIG. 10A is a flow chart for explaining the operation of the disaster information notification system 1 of the third embodiment.

Referring to FIG. 10A and the flow chart of FIG. 10B, the operation of the disaster information notification system 1 of the third embodiment will be described. Here, as in the third embodiment, a case where an emergency earthquake warning is received as the disaster information will be described as an example.

Figure 11:
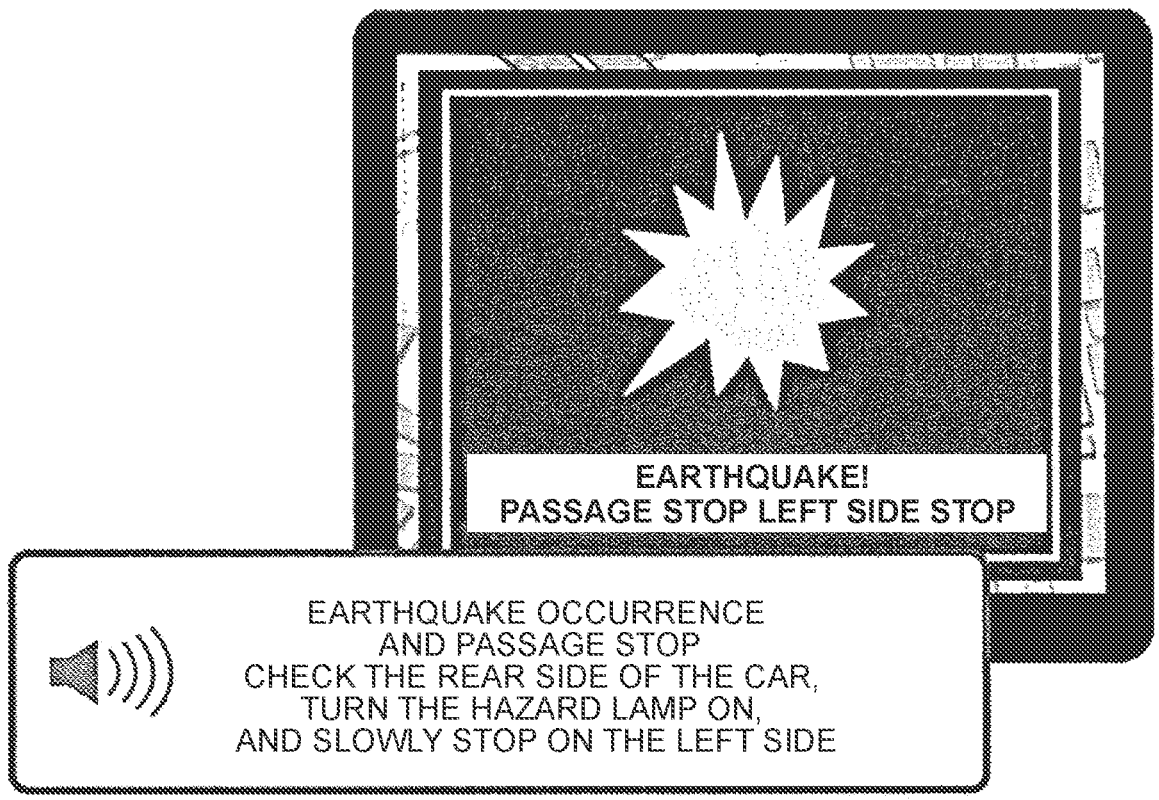

The operations from the step S11 to the step S22 are the same as those of the second embodiment. When the direction of the traveling destination of the target vehicle 14 is determined in the step S22, the guidance information generation unit 113 determines whether or not the area in which the vehicle 14 is traveling is a predetermined disaster (for example, an earthquake having an earthquake intensity of 3 or more). When the determination is affirmative (Y), the guidance information generation unit 113 generates an emergency stop window for the blinking of the hazard lamp and the emergency stop to the road shoulder or the like as illustrated in FIG. 11, and displays the emergency stop window on the display of the navigation system 15 (step S32). In addition to or in place of the blinking of the hazard lamp, a display may be provided to prompt a vehicle traveling around the vehicle to pay attention by calling a horn, blinking a brake lamp, or the like (regardless of the type of the display, as long as the display informs the vehicle of an emergency situation, such as the blinking of a hazard lamp, the calling of a horn, the blinking of a brake lamp, and other vehicles around the vehicle). By displaying such an emergency stop screen, it is possible to notify the occurrence of a disaster (earthquake or the like) between vehicles traveling on a specific road and prevent the occurrence of a secondary disaster.

When it is confirmed that the surrounding vehicle is temporarily stopped (step S33), the driver of the vehicle 14 causes the vehicle to stop on the road shoulder or the like (step S34) in order to ensure the safety of the vehicle 14 itself. As described above, in the third embodiment, since the emergency stop screen is displayed in addition to the display of the information in the second embodiment, it is possible to further assist the accurate determination of the driver in addition to the above-described embodiment.

Figure 10B:
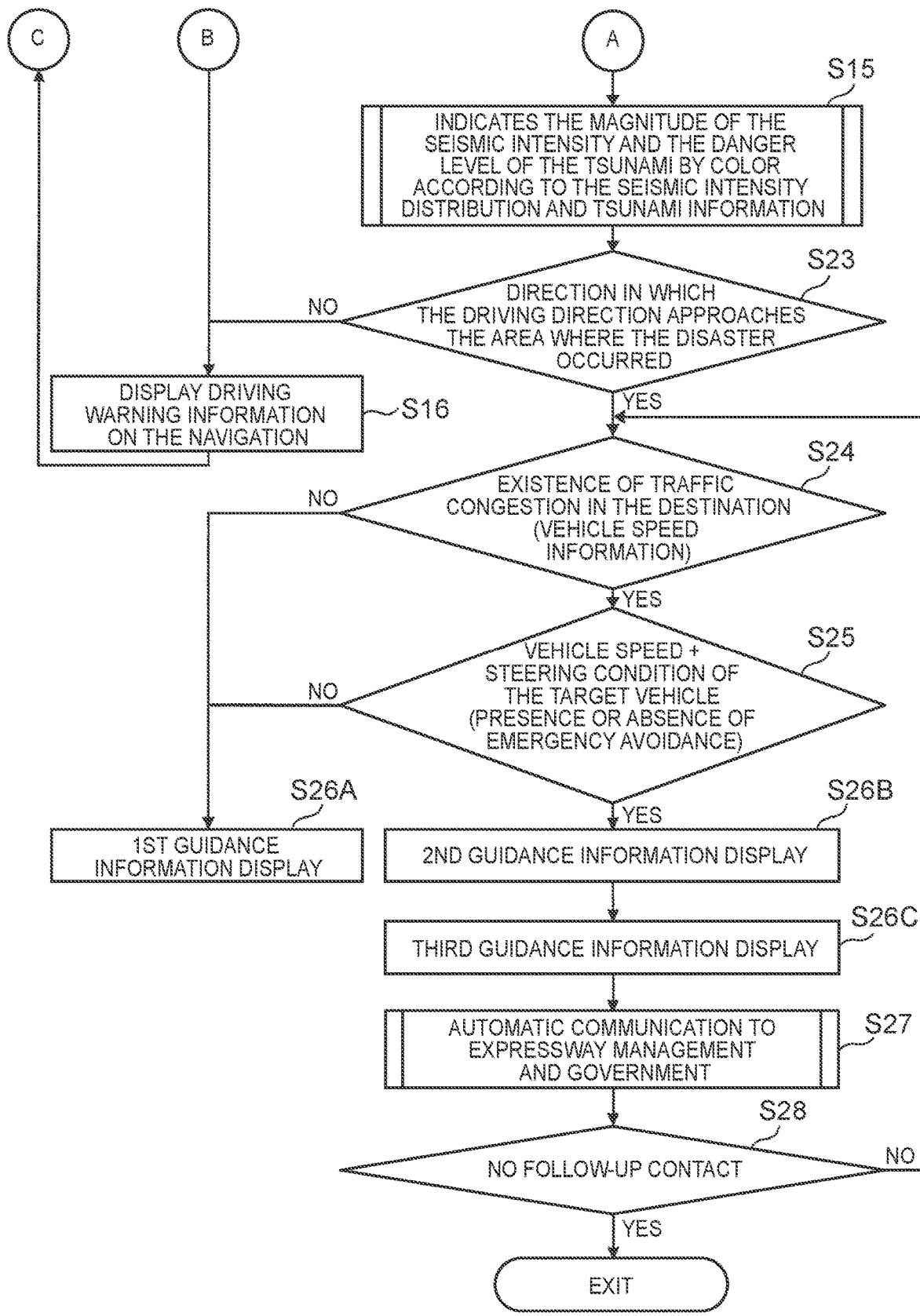
FIG. 10B is a flow chart for explaining the operation of the disaster information notification system 1 of the third embodiment.

Operations after S15 of steps in FIG. 10B are substantially the same as those in the second embodiment. However, in the illustrated FIG. 10B, in addition to displaying the second guidance information, the third guidance information is also presented as needed. The third guidance information is information based on the situation in the area where the target vehicle is currently located, while the second guidance information is information based on the situation in the traveling destination. For example, in a case where the target vehicle is caught in the elevated bridge or reaches the vicinity of a building that is likely to collapse, such as a high-rise building, guidance information for avoiding them can be displayed as third guidance information.

As described above, according to the disaster information notification system 1 of the third embodiment, it is possible to obtain the same effects as those of the above-described embodiment. In addition, according to the disaster information notification system 1 of the third embodiment, since the emergency stop information corresponding to the situation in the area in which the vehicle 14 is traveling is displayed, the driver of the vehicle 14 can take appropriate measures according to the situation.

The present disclosure is not limited to the above-described embodiments, and includes various modifications. For example, the above-described embodiments have been described in detail for the purpose of illustrating the present disclosure in an easy-to-understand manner, and are not necessarily limited to those having all the described configurations. In addition, a part of the configuration of an embodiment can be replaced with the configuration of another embodiment, and the configuration of another embodiment can be added to the configuration of an embodiment. Further, it is possible to add, delete, or replace a part of the configuration of each embodiment with another configuration.

What is claimed is:

1. A disaster information notification system comprising a processor configured to:
   acquire disaster information related to a disaster;
   acquire vehicle operation information indicating whether a vehicle is traveling on a specified road including an expressway, an automobile dedicated road, an elevated bridge, a predetermined coastal road, or a road of a predetermined mountain area;
   determine whether the vehicle is traveling on the specified road based on the vehicle operation information;
   display a screen indicating disaster intensity distribution information on a display unit mounted on the vehicle in a case where the processor determines that the vehicle is traveling on the specified road, the disaster intensity distribution information showing a distribution of disaster intensity separated by color in accordance with a degree of the disaster based on the disaster information; and
   display, on the display unit, occurrence disaster information indicating occurrence of the disaster based on the disaster information in a case where the processor determines the vehicle is not traveling on the specified road,
   wherein the processor is further configured to:
      determine whether traffic is congested at a travel destination of the vehicle on the specified road;
      generate first guidance information in a case where the processor determines that the traffic is not congested at the travel destination;
      generate second guidance information that has higher urgency than the first guidance information in a case where the processor determines that the traffic is congested at the travel destination;
      determine whether the disaster is occurring in an area in which the vehicle is traveling; and
      generate emergency stopping information for the vehicle in a case where the processor determines that the disaster is occurring in the area.

2. The disaster information notification system according to claim 1, wherein in a case where the processor determines that the vehicle is traveling on the specified road, the processor is configured to generate leaving guidance information guiding the vehicle to leave the specified road, based on the disaster information.

3. The disaster information notification system according to claim 2, wherein the emergency stopping information includes an indication prompting attention to another vehicle traveling around the vehicle.

4. The disaster information notification system according to claim 2, wherein the processor is configured to:
   determine whether an emergency avoidance operation of a preceding vehicle is executed at a travel destination;
   generate first guidance information in a case where the emergency avoidance operation is not executed; and
   generate second guidance information that has higher urgency than the first guidance information in a case where the emergency avoidance operation is executed.

* * * * *